March 22, 1966     K. E. COPPOCK     3,241,277
WINDOW MOUNTING
Filed Dec. 6, 1963
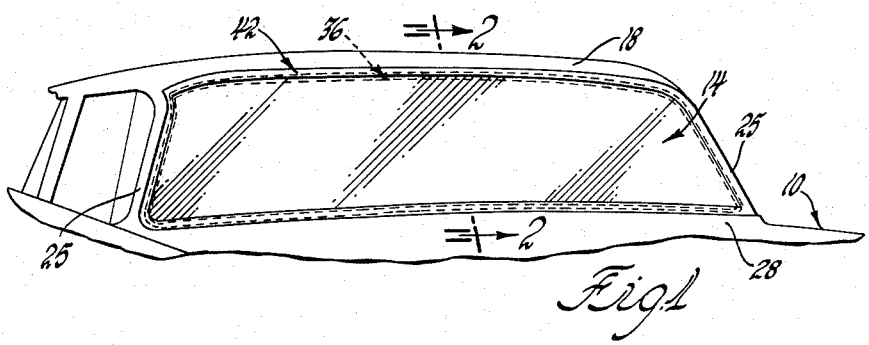
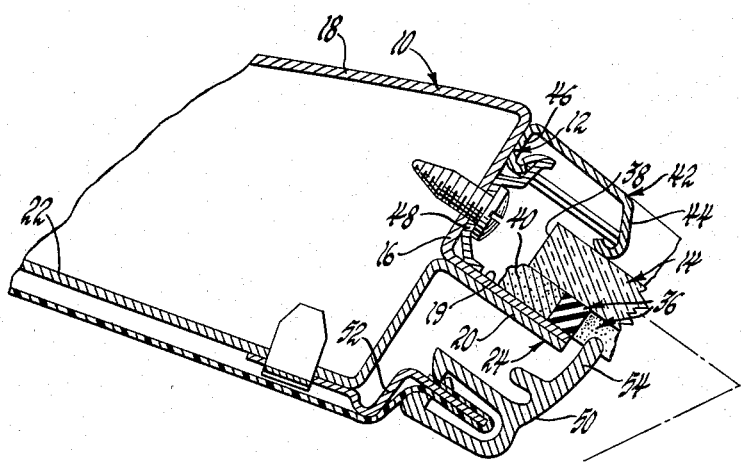
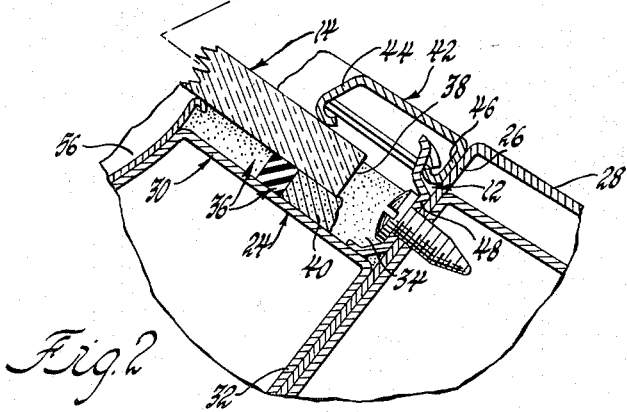
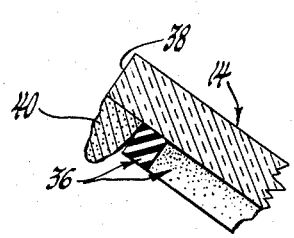
INVENTOR.
Kenneth E. Coppock
BY
Herbert Furman
ATTORNEY

United States Patent Office 3,241,277
Patented Mar. 22, 1966

3,241,277
WINDOW MOUNTING
Kenneth E. Coppock, Pleasant Ridge, Mich., assignor to General Motors Corporation, Detroit, Mich., a corporation of Delaware
Filed Dec. 6, 1963, Ser. No. 328,677
3 Claims. (Cl. 52—208)

This invention relates to vehicle bodies and more particularly to the mounting of transparent panels such as windshields or backlites on vehicle bodies.

The copending application of Campbell et al., Serial No. 170,963, filed February 5, 1962, now Patent 3,155,204, issued November 3, 1964, and assigned to the assignee of this invention, discloses the mounting of transparent windows on vehicle bodies by providing spacer support blocks along the lower edge portion of a body window opening defined by a first wall extending laterally to the plane of the opening and a second wall extending generally parallel to the plane of the opening, with the window being provided with a continuous bead of heat curable adhesive material adjacent the edge portion thereof which is brought into contact with the second wall and deformed when the window is mounted in place within the opening with the lower edge portion thereof resting on the spacer blocks. This method has been successfully proven in production, but at times due to the spacing of the window too closely to the second body wall or to other factors, the bead of adhesive material when deformed, extrudes out over the inner surface of the transparent panel beyond the edge portion of the second wall or beyond the area wherein the bead is normally concealed by the body garnish molding.

This invention overcomes this disadvantage by providing a strip of flexible material which is continuous around the window opening and is secured to either the transparent panel or to the second wall to effectively block the extrusion of the adhesive material past the edge portion of the second wall or past that area wherein the adhesive material can be effectively covered by the body garnish molding.

Thus, the flow of the adhesive material is effectively controlled and additionally the strip of material provides an effective spacing means for spacing the inner surface of the transparent panel with respect to the second body wall.

The primary object of this invention is to provide an improved means for mounting transparent panels on vehicle bodies. Another object of this invention is to provide an improved means for mounting transparent panels on vehicle bodies wherein the panel is secured to a body wall by a deformed bead of adhesive material previously applied to the panel, and means are provided for controlling the flow or extrusion of the bead of adhesive material when the panel is mounted on the body. These and other objects of the invention will be readily apparent form the following specification and drawings wherein:

FIGURE 1 is a partial front perspective view of a vehicle body having a windshield mounted thereon according to this invention;

FIGURE 2 is an enlarged sectional view taken generally along the plane indicated by line 2—2 of FIGURE 1; and FIGURE 3 is a cross sectional view of the edge portion of the windshield having the bead of adhesive material applied thereto prior to installation of the windshield on the body.

Referring now to the drawings, a vehicle body 10 includes a generally continuous body wall 12 defining a windshield opening which is adapted to be closed by a windshield 14. A lateral flange 16 of the roof panel 18 provides the wall 12 along the upper edge portion of the windshield opening and merges into a laterally extending flange 19 which is joined to a similar flange 20 of the body header 22 to form a pinchweld flange and provide the continuous body flange 24 along the upper edge portion of the windshield opening. Flange 24 extends generally parallel to the plane of the windshield opening defined by wall 12. The body wall 12 and body flange 24 along the side edge portions of the windshield opening are defined by flanges of the body pillars 25 in a conventional manner. Along the lower edge portion of the windshield opening, wall 12 is defined by a lateral flange 26 of the body cowl panel 28. A body member 30 has one leg 32 thereof secured to the flange 26 of the cowl panel and another leg thereof extending generally parallel to the plane of the window opening and providing the body flange 24 along the lower edge portion of the windshield opening. Body structure such as hereinbefore described is common in present and past production vehicle bodies and, although various details of the body parts have not been shown and described, they are known to persons skilled in this art. It will also be understood that in certain body structures, the body flanges may be formed in other ways and, accordingly, this invention is not limited to flanges formed in the particular manner described herein. Generally, this invention may be successfully practiced in mounting a windshield or backlite or other fixed windows on a vehicle body as long as the body includes a first wall extending laterally to the plane of the opening and a second wall extending parallel to the plane of the opening.

In present practice, the bodies are completely painted prior to the installation of either the windshield or the backlite. Since the painting operation generally includes several spraying and sanding steps, the installation of the fixed vehicle windows is best done after the body is painted.

After the body is painted, a plurality of blocks 34 of rubber of generally rectangular shape are secured to the body wall 12 adjacent the wall 24 along the lower edge portion of the windshield opening. The blocks 34 may be either individually cemented to the wall 12 by means of suitable cements, or a layer of curable adhesive material may be first applied to the walls 12 and 24 along the lower edge portion of the opening and the blocks 34 embedded therein. In the specific embodiment shown, three such blocks 34 are provided, with two being located adjacent the lower side corners of the windshield opening and the third being located substantially at the centerline of the body.

Prior to installation of the windshield 14 on the body, a continuous uninterrupted strip 36 of rubber or other resilient material having the general outline or shape of the windshield is secured to the inner surface thereof as shown in FIGURE 3. Preferably, the strip 36 is cemented to the inner surface of the windshield by any suitable cement and it will be noted that the strip is spaced inwardly from the edge portion 38 of the windshield a sufficient distance so that a bead 40 of heat curable adhesive material may be applied to the inner surface of the windshield between the strip 36 and the edge portion 38. The bead 40 is of generally triangular, cross sectional shape and normally extends from the inner surface of the windshield a greater distance than does the strip 36.

The windshield 14 is mounted on the body by resting the lower edge portion thereof on the blocks 34, with the windshield being located generally angularly and outwardly of the windshield opening, and then rotating the windshield inwardly of the opening until the outer surface of the strip 36 engages the wall 24 while simultaneously deforming the bead 40 of adhesive material so that the bead 40 provides a continuous uninterrupted generally rectangularly shaped bead or layer of adhesive material adhesively securing the inner surface of the windshield to the body wall 24. The strip 36 provides a spacing means for spacing the inner surface of the windshield 14 from the body wall 24, and additionally and importantly acts as a dam or restriction so that the bead 40 of adhesive material is extruded outwardly of the body opening or towards the edge portion 38 of the windshield after it first fills any voids between the bead and the strip 36 so that none of the adhesive material flows inwardly of the inner surface of the windshield or beyond the edge of the wall 24.

Thereafter, the adhesive material is cured as to effectively secure the windshield 14 to the body. The manner in which the windshield 14 is mounted on the body has been generally described herein, and if further details are necessary or of interest, reference may be had to the aforementioned copending application of Campbell et al.

The specific adhesive material which may be used to successfully practice the invention is commercially available under the trade name of "Weatherban". This material is a polysulfide base material having suitable fillers and solvents added thereto. It is heat curable and when cured, exhibits properties of rubber in that it is capable of accepting shear stress, will not crack or corrode in various climates, and will wet both glass and painted metal. The latter property is important in order to ensure a continuous bond between the body flange 24 and the window panel.

The outer body reveal molding 42 are of generally U-shape, having one leg 44 thereof resiliently engaging the outer surface of the panel 14 generally opposite the strip 36 and the other leg 46 thereof hooked under lanced tabs of clips 48 which are screw mounted on the body wall 12 prior to installation of the windshield 14 within the body opening. Along the lower edge portion of the opening, it will be understood that the clips 48 are provided intermediate the blocks 34.

The inner garnish molding 50 along the upper and side edge portions of the window opening is of a clamp-on type resiliently engaging brackets 52 mounted on the inner roof rail header and including an outwardly extending leg or flange 54 which extends substantially to the inner surface of the windshield 14 and overlies the strip 36. Along the lower edge portion of the window opening, the inner body garnish molding is provided by a panel member 56 which also extends substantially to the inner surface of the windshield and overlies the strip 36.

The strip 36 effectively controls the flow of adhesive material between the inner surface of the windshield 14 and the outer surface of the wall 24 when the windshield 14 is mounted on the body and the bead of adhesive material is deformed. Although in the specific embodiment described, the strip 36 was adhesively secured to the inner surface of the windshield 14, it will be understood that the strip may likewise be applied to the wall 24 adjacent the edge portion thereof rather than being secured to the windshield.

Thus, this invention provides an improved vehicle body window mounting structure.

I claim:

1. In combination with a vehicle body having a closure opening therein defined by a first wall and including a generally continuous body member extending generally parallel to the plane of said opening, a panel member closing said opening and having a surface thereof located in generally spaced juxtaposed relationship to a surface of said body member, a continuous strip of resilient material secured to the surface of one of said members spaced inwardly from the edge portion thereof and engaging the surface of the other of said members adjacent the edge portion thereof, and a layer of adhesive material adhesively securing said surfaces to each other and being located between said strip of resilient material and the edge portion of said panel member, said layer of adhesive material normally having a thickness greater than that of said strip of resilient material and being deformed when said panel member is mounted on said body, said strip of resilient material acting as a dam during deformation of said adhesive material to force said adhesive material to extrude outwardly of said opening and towards said edge portion of said panel.

2. The combination recited in claim 1 wherein said strip of resilient material is secured to the inner surface of said panel member inwardly from the edge portion thereof and engages said body member when said panel member is mounted on said body.

3. The combination recited in claim 1 wherein said strip of resilient material is secured to the surface of said body member inwardly from the edge portion thereof and engages the inner surface of said panel member inwardly from the edge portion thereof when said panel member is mounted on said body.

References Cited by the Examiner

UNITED STATES PATENTS

| | | | |
|---|---|---|---|
| 2,827,197 | 3/1958 | Fiske | 220—81 X |
| 2,835,955 | 5/1958 | Synder. | |
| 3,155,204 | 11/1964 | Campbell et al. | 189—77 |

REINALDO P. MACHADO, *Primary Examiner.*

HARRISON R. MOSELEY, *Examiner.*